L. MASCHEK.
COTTON TAG AND RECORDER.
APPLICATION FILED DEC. 7, 1916.
1,255,904.
Patented Feb. 12, 1918.
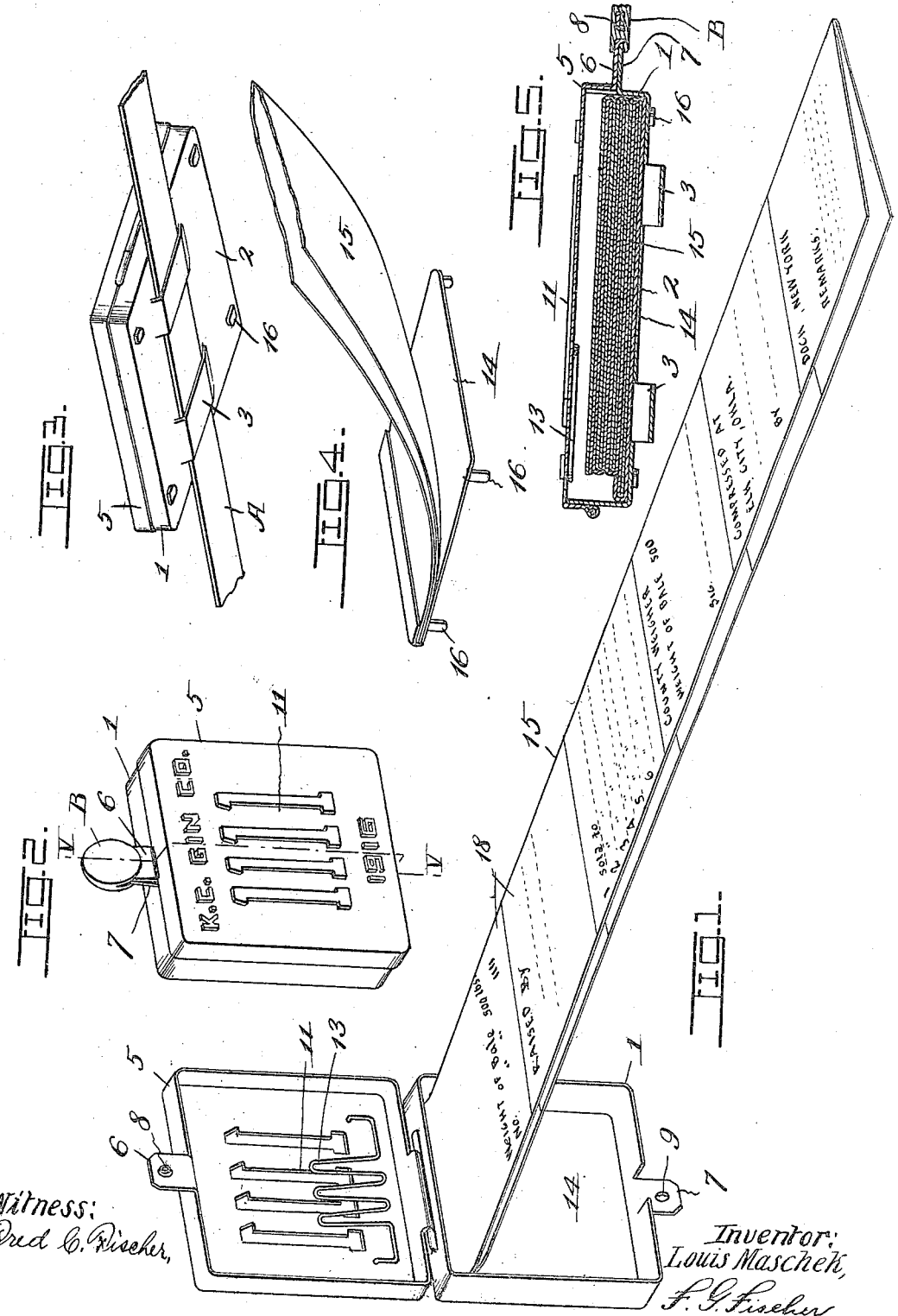
Witness:
Fred C. Fischer,
Inventor:
Louis Maschek,
F. G. Fischer,
Attorney.

UNITED STATES PATENT OFFICE.

LOUIS MASCHEK, OF KANSAS CITY, MISSOURI.

COTTON TAG AND RECORDER.

1,255,904.  Specification of Letters Patent.  Patented Feb. 12, 1918.

Application filed December 7, 1916. Serial No. 135,643.

*To all whom it may concern:*

Be it known that I, LOUIS MASCHEK, a citizen of the United States, residing at Kansas City, in the county of Jackson and State of Missouri, have invented certain new and useful Improvements in Cotton Tags and Recorders, of which the following is a specification.

My invention relates to a cotton bale tag, recorder, and sample case, and my object is to provide a simple labor saving device of this character whereby a complete record of a bale of cotton can be accurately kept from the time it reaches the ginner until it passes into the hands of the spinner.

Ordinarily a bale of cotton passes through the hands of several parties in its passage from the raiser to the spinner, and since there has been no system heretofore for permanently recording the weight, condition and grade of the bale, and the names of the various parties through whose hands it passes, much misrepresentation and fraud has been practised by unreliable parties dealing in cotton.

By the use of my invention all opportunity for misrepresentation and fraud is abolished, as I provide numbered devices which are permanently applied to the bale bands as the cotton is baled by the ginner and each device contains a record sheet on which is entered the names of the ginner, the raiser, the buyers, the grade of cotton, its weight and such other information as is desired. Each device is also adapted to hold a sample of the cotton constituting the bale to which the device is secured and hence the great loss which occurs under the old system of taking numerous samples from the same bale is avoided.

In order that the invention may be fully understood, reference will now be made to the accompanying drawing, in which:

Figure 1 is a perspective view of the device in open position.

Fig. 2 is a perspective view of the device closed and sealed.

Fig. 3 is a perspective view of the device applied to a bale band.

Fig. 4 is a detail perspective of a plate and a record sheet employed in carrying out the invention.

Fig. 5 is a central section on line V—V of Fig. 2.

In carrying out the invention, I employ a receptacle 1, the bottom 2 of which has one or more loops 3 stamped therefrom to receive a bale band A, so that the device can be permanently secured to a bale of cotton when the same is baled by the ginner.

The receptacle 1 has a hinged lid 5 provided at its front side with a lug 6 corresponding to a lug 7 on the front side of the receptacle, with the exception that said lug 6 has a tubular stud 8 adapted to enter an opening 9 in the lug 7, as disclosed by Fig. 5, when the lid is closed.

The lid 5 has an identifying number 11, together with the name and location of the ginner, who applies it to the bale band A, and the year in which the device is used, embossed thereon so that the numbers and letters cannot be erased by persons intent on fraud. The inside of the lid 5 is provided with a resilient holder 13 for holding a sample of the cotton constituting the bale to which the device is secured, so that other samples often aggregating one-fourth of the entire bale need not be taken from said bale.

The receptacle 1 is provided with a plate 14 to form a smooth support for a record sheet 15, when the various items are entered thereon. Said plate 14 is permanently secured to the inner side of the receptacle bottom 2 by any suitable means. In the drawing, I have shown said plate provided with lugs 16, which are passed through corresponding openings in the bottom 2, against the outer side of which the lugs are then bent and soldered to permanently secure them in place.

The record sheet 15 is provided with various divisions 18 for entry of the names of the ginner, raiser, buyers, county weigher, the weight of the bale, the number of the bale, which corresponds with the embossed number 11 on the lid 5, and such other information as may be desired, to provide a complete history of the bale from the time it reaches the ginner until it is finally disposed of to the spinner.

In order that each party to the transaction may retain a copy of the entry which he makes on the sheet 15, the latter is, preferably, folded longitudinally as disclosed by Fig. 1. By placing a sheet of carbon beneath the two sides of the folded record, an entry written on the top side is reproduced on the side below, and that portion of the latter containing the entry can be torn out by the party who made it.

In practice the ginner obtains a sufficient supply of the devices to last him through a year. Said devices are consecutively numbered so that when applied to the bales by the ginner each bale can be distinguished from the others by its number.

Beginning with the ginner and the raiser, the various parties through whose hands the bale passes make their respective entries upon the record sheet 15. When the bale reaches the county or other official weigher, he compares the weight of the bale with the weight entered by the ginner and if he finds the latter's entry correct, he then fills out and signs his division of the entry sheet, and after removing his carbon copy, folds said record sheet and places it in the receptacle 14, the lid of which is then closed and sealed with a suitable seal B a portion of which is forced through the tubular boss 8. As the latter is of harder material than the seal, which usually consists of lead, it protects said seal where it passes through the boss from being cut with a knife, hence an unauthorized person cannot gain access to the record sheet and the sample of cotton, unless the seal is mutilated to such an extent as to clearly show it has been tampered with.

From the foregoing description it is apparent that I have produced a device embodying all of the advantages above enumerated, and while I have shown and described the preferred form of the invention I reserve the right to make such changes in the construction, combination, and arrangement of parts as properly fall within the spirit and scope of the claims.

Having thus described my invention, what I claim and desire to secure by Letters Patent, is:

1. A cotton bale attachment including a receptacle having loops struck-out from its bottom and having apertures, a plate seated on said bottom and having lugs positioned to extend through the apertures and clenched against the outer face of said bottom, and a record sheet borne by the plate, said loops being formed so as to receive therethrough the usual bale-tying-bands.

2. A cotton bale attachment including a receptacle having loops struck-out from its bottom and having apertures, a plate seated on said bottom, means to secure the plate to the receptacle, so as to cause said plate to extend over and cover the openings formed by striking out said loops, and a record sheet borne by the plate, said loops being formed so as to receive therethrough the usual bale-tying-bands.

3. A cotton bale attachment including a receptacle having loops struck-out from its bottom and having apertures, a plate seated on said bottom, so as to cause said plate to extend over and cover the openings formed by striking out said loops, means to secure the plate to the receptacle, and a record sheet borne by the plate, said loops being formed so as to receive therethrough the usual bale-tying-bands, one end of the plate being bent inwardly and over an end of the record sheet to clamp the latter to the plate.

4. A cotton bale attachment including a receptacle, means to enable securement of the receptacle to the usual bale-tying-bands, a swingable lid for the receptacle, means borne by the lid for holding a sample of the cotton, and a record sheet borne by the receptacle, the sample holder being movable with the lid to extend over the free end of the record sheet upon closure of the lid.

In testimony whereof I affix my signature, in the presence of two witnesses.

LOUIS MASCHEK.

Witnesses:
HENRY DAVIS,
F. G. FISCHER.

Copies of this patent may be obtained for five cents each, by addressing the "Commissioner of Patents, Washington, D. C."